(12) United States Patent
Rapp et al.

(10) Patent No.: US 11,519,320 B2
(45) Date of Patent: Dec. 6, 2022

(54) EXPANSION TANK ARRANGEMENT OF A COOLING CIRCUIT AND METHOD FOR OPERATING AN EXPANSION TANK ARRANGEMENT OF A COOLING CIRCUIT

(71) Applicant: Dr. Ing. h.c. F. Porsche Aktiengesellschaft, Stuttgart (DE)

(72) Inventors: Tobias Rapp, Weissach (DE); Daniel Eichacker, Gechingen (DE); Fabian Zeyher, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 17/388,068

(22) Filed: Jul. 29, 2021

(65) Prior Publication Data
US 2022/0042446 A1    Feb. 10, 2022

(30) Foreign Application Priority Data

Aug. 4, 2020   (DE) ..................... 10 2020 120 505.8

(51) Int. Cl.
*F01P 11/02* (2006.01)
*B60K 11/02* (2006.01)
*F01P 11/18* (2006.01)

(52) U.S. Cl.
CPC ............ *F01P 11/029* (2013.01); *B60K 11/02* (2013.01); *F01P 11/0238* (2013.01); *F01P 11/18* (2013.01)

(58) Field of Classification Search
CPC ...... F01P 11/029; F01P 11/0238; F01P 11/18; F01P 11/02; F01P 2025/04; B60K 11/02
See application file for complete search history.

(56) References Cited

U.S. PATENT DOCUMENTS

| 2011/0308484 | A1* | 12/2011 | Peterson | F01P 11/029 |
| | | | | 123/41.01 |
| 2015/0217622 | A1 | 8/2015 | Enomoto et al. | |
| 2015/0345365 | A1* | 12/2015 | Wikström | F01P 3/22 |
| | | | | 123/41.44 |

FOREIGN PATENT DOCUMENTS

| DE | 102005007781 A1 | 8/2006 |
| DE | 102011108041 A1 | 1/2013 |
| DE | 112013004227 T5 | 6/2015 |

* cited by examiner

*Primary Examiner* — Jacob M Amick
(74) *Attorney, Agent, or Firm* — Leydig, Voit & Mayer, Ltd.

(57) ABSTRACT

An expansion tank arrangement is for a cooling circuit. The expansion tank arrangement has: an expansion tank having a housing with an internal volume configured to receive a cooling fluid; a fluid connection configured to connect the expansion tank to the cooling circuit for supplying the cooling fluid; and a pneumatic connection configured to connect the expansion tank to a pneumatic supply device for pressurizing the expansion tank with a pneumatic medium using a pneumatic supply line. A valve that is configured to influence the pressurization of the expansion tank is in the pneumatic supply line between the expansion tank and the pneumatic supply device.

16 Claims, 2 Drawing Sheets

EXPANSION TANK ARRANGEMENT OF A COOLING CIRCUIT AND METHOD FOR OPERATING AN EXPANSION TANK ARRANGEMENT OF A COOLING CIRCUIT

CROSS REFERENCE TO RELATED APPLICATIONS

This application claims benefit to German Patent Application No. DE 10 2020 120 505.8, filed on Aug. 4, 2020, which is hereby incorporated by reference herein.

FIELD

The invention relates to an expansion tank arrangement of a cooling circuit and to a method for operating an expansion tank arrangement of a cooling circuit, in particular of a motor vehicle.

BACKGROUND

Motor vehicles with electrified drive trains, such as hybrid vehicles with an internal combustion engine and an electric motor as drive motors, for example, have batteries and control devices, which have to be temperature-controlled. For this purpose, these units are integrated into a cooling circuit, which may also be designed, for example, as a low-temperature cooling circuit. In modern low-temperature coolant circuits of this kind, which are used in electrified drive trains (PHEV) and battery-electric vehicles (BEV) for cooling electrical components, the operating temperatures of the coolant are significantly below the temperatures of the coolant of conventional drives, the typical temperatures of which in the operating state are approximately 90° C. or more. In combination with complex hydraulic topologies, which necessitate high proportions of hose with long lengths, entailing a high absorption volume of the hose, this leads to reduced pressure build-up in the expansion tank, even in the case of systems that are warm from operation. In addition, operating temperatures in the coolant of 10° C. to 20° C. in active cooling phases are the desired temperatures in the area of the high-voltage battery cooling system, as well as other high-voltage components, and thus strong viscosity influences are at work in the coolant. At the same time, the requirements on the volumetric flow via the components and thus the electrical coolant pump power are continuing to increase. In this case, the aim of such cooling circuits and of the operating methods for cooling is to allow an improvement in the heat transfer in the components and an increase in heat dissipation in order to achieve rapid charging times or power availability in the drive components. In the event that oil is used as coolant instead of cooling water together with any additives, the increased viscosity of the correspondingly used fluid necessitates an increase in pump power.

All these properties lead to very low absolute pressures on the pump suction side and thus to acoustic abnormalities, collapsing coolant hoses and pump cavitation, i.e. to a reduction in efficiency, a reduction in usable hydraulic power and poor bleeding capacity of the cooling system.

SUMMARY

In an embodiment, the present disclosure provides an expansion tank arrangement that is for a cooling circuit. The expansion tank arrangement has: an expansion tank having a housing with an internal volume configured to receive a cooling fluid; a fluid connection configured to connect the expansion tank to the cooling circuit for supplying the cooling fluid; and a pneumatic connection configured to connect the expansion tank to a pneumatic supply device for pressurizing the expansion tank with a pneumatic medium using a pneumatic supply line. A valve that is configured to influence the pressurization of the expansion tank is in the pneumatic supply line between the expansion tank and the pneumatic supply device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
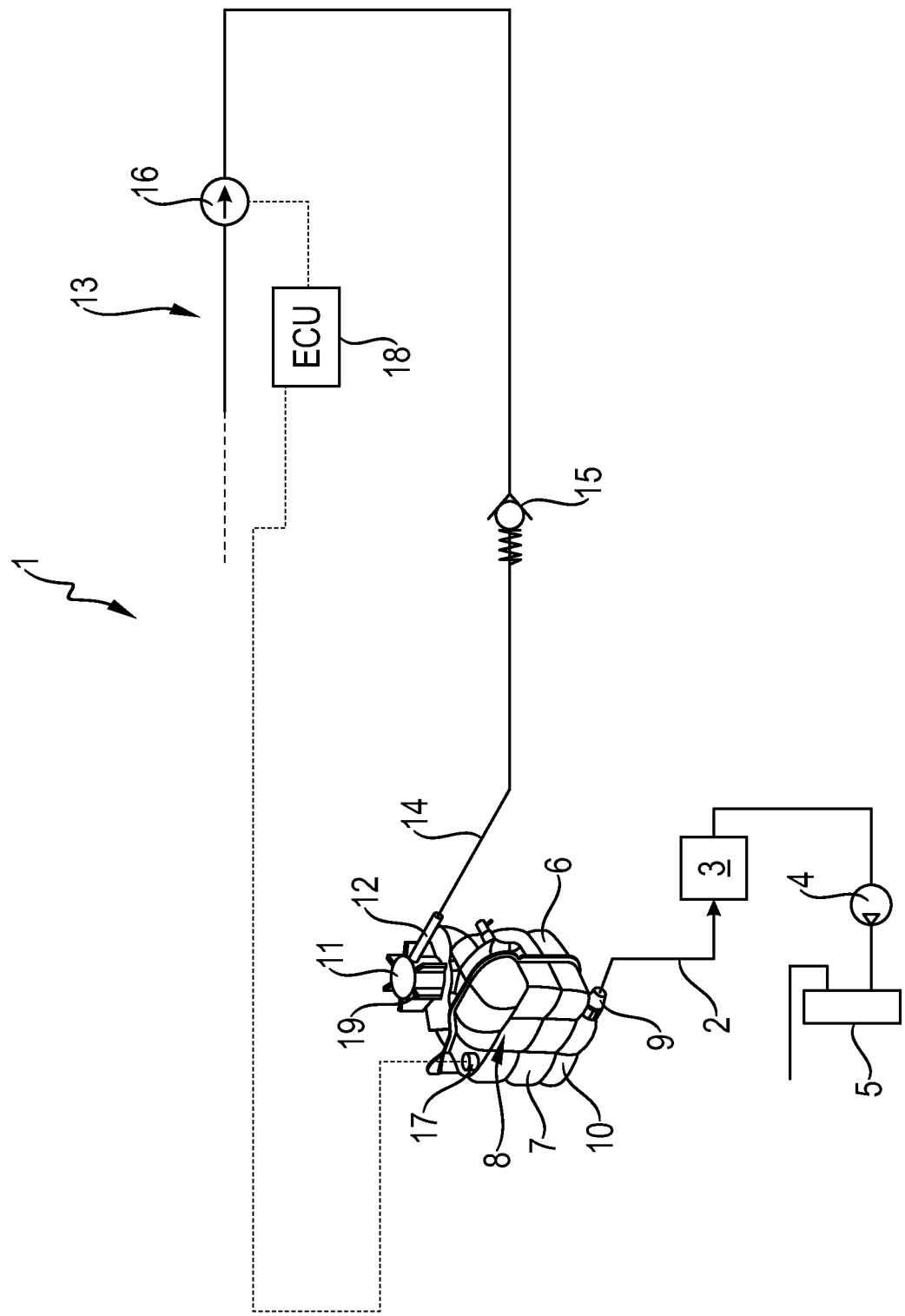
FIG. 1 shows a schematic view of a first exemplary embodiment of an expansion tank arrangement.

Embodiments of the present invention provide an expansion tank arrangement of a cooling circuit and a method for operating an expansion tank arrangement of a cooling circuit, in particular of a motor vehicle, which reduce or even avoid the disadvantages of the prior art.

An exemplary embodiment of the invention relates to an expansion tank arrangement of a cooling circuit, in particular for a motor vehicle, having an expansion tank having a housing with an internal volume for receiving a cooling fluid, having a fluid connection for connecting the expansion tank to the cooling circuit for supplying cooling fluid, furthermore having a pneumatic connection for connecting the expansion tank to a pneumatic supply device for pressurizing the expansion tank with a pneumatic medium by means of a pneumatic supply line, wherein a valve for influencing the pressurization of the expansion tank is provided in the pneumatic supply line between the expansion tank and the pneumatic supply device. This makes it possible for the operation of the expansion tank to be adequately ensured even at low cooling fluid temperatures and high viscosities and for the undesirable effects to be reduced or avoided.

In one exemplary embodiment, it is advantageous if the housing has a tank and a tank cap, wherein the pneumatic connection is provided on the cap and/or on the tank. As a result, selective pressurization above the liquid surface of the cooling fluid can be achieved. Arrangement on the cap is particularly advantageous since it is typically arranged at the highest point of the housing.

It is also expedient if the valve is a check valve, a valve that can be subjected to active open-loop control, and/or a valve that can be subjected to active closed-loop control. This makes it possible, in the simplest case, for pressurization to take place and for the check valve to prevent a pressure drop in the expansion tank. In arrangements subject to open-loop or closed-loop control, pressurization by the pneumatic pressure can be set by means of the valve that can subjected to open-loop or closed-loop control.

In one exemplary embodiment, it is advantageous if the pneumatic supply device is a compressor that delivers air or some other gaseous medium or is a compressor having a downstream pressure accumulator, wherein the compressor delivers air or some other gaseous medium to the pressure accumulator or is a pneumatic supply device of a motor vehicle or a motor vehicle unit having a compressor with a downstream pressure accumulator, wherein the compressor delivers air or some other gaseous medium to the pressure accumulator. It is thereby possible, in a simple case, for the pressure to be made available by a simple compressor, thus making it possible to achieve a simple pressure supply of a pneumatic medium and a defined pressurization. In a more complex application, the pressure of the pneumatic medium for pressurization can also be subjected to open-loop or even closed-loop control in order to achieve a defined pressure value or to keep it in a predefined pressure range.

It is particularly advantageous if the expansion tank and/or the compressor and/or the pressure accumulator and/or the pneumatic supply line have/has at least one pressure sensor for local pressure measurement of the pneumatic medium, in particular of air or some other gaseous medium. By means of the measured values of the pressure sensor or the pressure sensors, the selective setting, open-loop control or closed-loop control of the pressurization can be performed.

One exemplary embodiment of the invention relates to a method for operating an expansion tank arrangement of a cooling circuit, in particular of a motor vehicle, wherein the expansion tank arrangement is constructed with an expansion tank having a housing with an internal volume for receiving a cooling fluid, having a fluid connection for connecting the expansion tank to the cooling circuit for supplying cooling fluid, furthermore having a pneumatic connection for connecting the expansion tank to a pneumatic supply device for pressurizing the expansion tank with a pneumatic medium by means of a pneumatic supply line, wherein a valve for influencing the pressurization of the expansion tank is provided in the pneumatic supply line between the expansion tank and the pneumatic supply device, wherein the internal volume of the expansion tank is pressurized by means of the pneumatic supply device by means of the pneumatic medium. This makes it possible to reduce or avoid the disadvantages of the prior art.

It is particularly advantageous if the valve is a check valve which prevents a pressure drop in the expansion tank, and/or if the valve is a valve which can be subjected to active open-loop control and/or a valve which can be subjected to active closed-loop control and by means of which the pneumatic pressure in the expansion tank is set and/or subjected to open-loop control and/or closed-loop control. It is thereby possible to set the pressurization selectively to a reference value or in a predeterminable range in order to reduce or avoid the disadvantages in the prior art.

It is also advantageous if the pneumatic supply device is a compressor which delivers air or some other gaseous medium toward the expansion tank and/or is a compressor having a downstream pressure accumulator, wherein the compressor delivers air or some other gaseous medium to the pressure accumulator or is a pneumatic supply device of a motor vehicle or a motor vehicle unit having a compressor with a downstream pressure accumulator, wherein the compressor delivers air or some other gaseous medium to the pressure accumulator. Pressurization can thereby be achieved with simple means or with means that are already present in a motor vehicle.

It is also advantageous if the pneumatic pressure in the expansion tank is set, or subjected to open-loop control and/or closed-loop control, by means of the valve, the compressor and/or the pressure accumulator.

It is also advantageous, in a further exemplary embodiment, if the expansion tank and/or the compressor and/or the pressure accumulator and/or the pneumatic supply line have/has at least one pressure sensor for local pressure measurement of the pneumatic medium, in particular of air or some other gaseous medium, wherein the pneumatic pressure in the expansion tank is set, or subjected to open-loop control and/or closed-loop control, by means of the valve, the compressor and/or the pressure accumulator on the basis of measured pressure values of the pressure sensor or of the pressure sensors.

FIG. 1 shows, in a schematic illustration, a first exemplary embodiment of an expansion tank arrangement 1 of a cooling circuit 2, in particular for a motor vehicle. The cooling circuit 2 is illustrated only schematically and is provided as a conventional cooling circuit 2 with at least one component 3 to be cooled or at least one unit to be cooled, which is in the fluid flow of a coolant. In this case, a coolant pump 4 and, for example, a coolant cooler 5 are provided. Furthermore, a thermostat, a radiator and further components of the cooling circuit 2 can be provided.

The expansion tank arrangement 1 comprises an expansion tank 6, in which coolant can be stored and which serves to equalize the volume of the coolant in the cooling circuit 2.

The expansion tank 6 is constructed with a housing 7 having an internal volume 8 for receiving a cooling fluid. A fluid connection 9 for connecting the expansion tank 6 to the cooling circuit 2 for the purpose of supplying cooling fluid is also provided.

Here, the expansion tank 6 with its housing 7 consists, for example, of a tank 10 and a tank cap 11, which is mounted detachably on the tank 10.

Furthermore, a pneumatic connection 12 for connecting the expansion tank 6 to a pneumatic supply device 13 for pressurizing the expansion tank 6 with a pneumatic medium by means of a pneumatic supply line 14 is provided. The pneumatic connection 12 is preferably provided on the tank cap 11 and/or on the tank 10.

A valve 15 for influencing the pressurization of the expansion tank 6 by means of the pneumatic medium is provided in the pneumatic supply line 14 between the expansion tank 6 and the pneumatic supply device 13.

In this case, the pneumatic medium can preferably be air or, for example, some other gaseous medium, such as nitrogen, $CO_2$, etc.

In the exemplary embodiment in FIG. 1, the valve 15 is a check valve, which is intended to prevent the pressure dropping in the expansion tank 6.

Alternatively or in addition, the valve 15 can also be a valve 15 that can be subjected to active open-loop control and/or a valve 15 that can be subjected to active closed-loop control.

The pneumatic supply device 13 is designed as a compressor 16, which delivers air or some other gaseous medium. The expansion tank 6 and/or the compressor 16 and/or the pneumatic supply line 14 can have at least one pressure sensor 17 for local pressure measurement of the pneumatic medium, in particular of air or some other gaseous medium. In this case, the measured value of the pressure sensor 17 is passed on to a control unit 18 for controlling the compressor 16.

In the exemplary embodiment shown in FIG. 1, the pressure build-up of the pneumatic medium is generated by means of the, in particular small, compressor 16, which is activated for a time period t, for example. An excessively high pressure which may arise in the expansion tank 6 is reduced via the opening pressure of the pressure relief valve 19 located in the expansion tank cap 11. The time duration t of the activation of the compressor 16 can be fixed or can be implemented as a function of the coolant temperature T by means of a characteristic curve.

Figure 2:
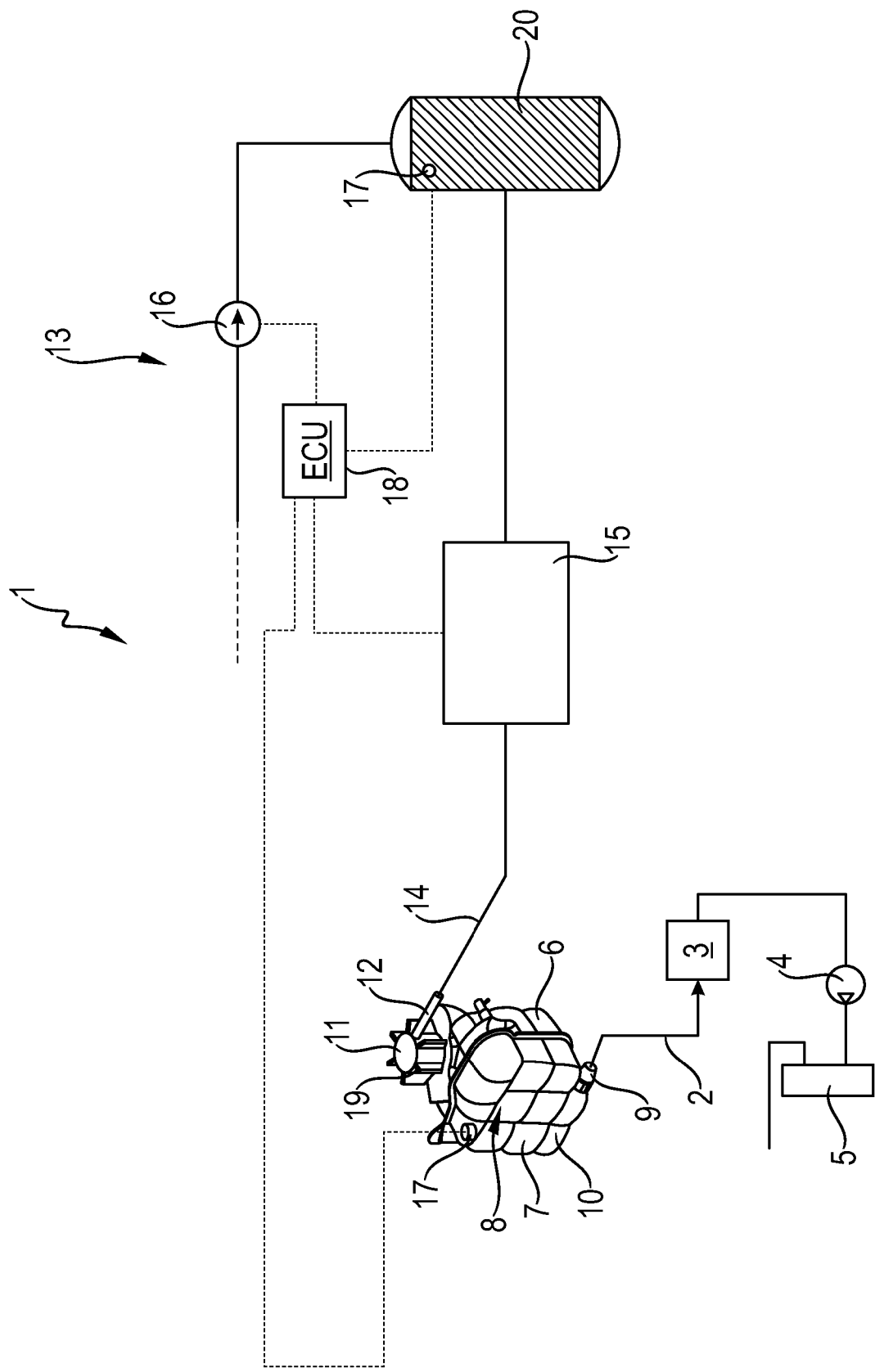
FIG. 2 shows a schematic illustration of a second exemplary embodiment of an expansion tank arrangement.

FIG. 2 shows, in a schematic illustration, a second exemplary embodiment of an expansion tank arrangement 1 of a cooling circuit 2, in particular for a motor vehicle. Here, the cooling circuit 2 is also illustrated once again only schematically and is provided as a conventional cooling circuit 2 with at least one component 3 to be cooled or at least one unit to be cooled, which is in the fluid flow of a coolant. In this case, a coolant pump 4 and, for example, a coolant cooler 5 are provided. Furthermore, a thermostat, a radiator and further components of the cooling circuit 2 can be provided.

The expansion tank arrangement 1 comprises an expansion tank 6, in which coolant can be stored and which serves to equalize the volume of the coolant in the cooling circuit 2.

The expansion tank 6 is constructed with a housing 7 having an internal volume 8 for receiving a cooling fluid. A fluid connection 9 for connecting the expansion tank 6 to the cooling circuit 2 for the purpose of supplying cooling fluid is also provided.

Here, the expansion tank 6 with its housing 7 consists, for example, of a tank 10 and a tank cap 11, which is mounted detachably on the tank 10.

Furthermore, a pneumatic connection 12 for connecting the expansion tank 6 to a pneumatic supply device 13 for pressurizing the expansion tank 6 with a pneumatic medium by means of a pneumatic supply line 14 is provided. The pneumatic connection 12 is preferably provided on the tank cap 11 and/or on the tank 10.

A valve 15 for influencing the pressurization of the expansion tank 6 by means of the pneumatic medium is provided in the pneumatic supply line 14 between the expansion tank 6 and the pneumatic supply device 13.

In this case, the pneumatic medium can preferably be air or, for example, some other gaseous medium, such as nitrogen, CO2, etc.

In the exemplary embodiment in FIG. 2, the valve 15 is a valve 15 that can be subjected to active open-loop control and/or a valve 15 that can be subjected to active closed-loop control. In this case, as an option, a check valve can additionally be provided, or can be formed or simulated by the valve 15, which is intended to prevent the pressure dropping in the expansion tank 6. The valve 15 can be actuated, in particular, by a control unit 18 for setting the pressure and/or the flow rate.

The pneumatic supply device 13 is designed as a compressor 16 with a downstream pressure accumulator 20, which delivers air or some other gaseous medium. In this case, the compressor 16 with the pressure accumulator 20 can be provided separately or can already be part of the motor vehicle, in particular for some other application, for example for an air suspension, etc. Correspondingly, the pressure accumulator 20 provided for this purpose could also be used for pressurizing the expansion tank 6.

The expansion tank 6 and/or the compressor 16 and/or the pressure accumulator 20 and/or the pneumatic supply line 14 can have at least one pressure sensor 17 for local pressure measurement of the pneumatic medium, in particular of air or some other gaseous medium. In this case, the measured value of the pressure sensor 17 is passed on to a control unit 18 for controlling the compressor 16 and/or the valve 15.

In the exemplary embodiment shown in FIG. 2, the pressure build-up of the pneumatic medium is generated by means of the pressure accumulator 20 connected downstream of a compressor 16. An excessively high pressure which may arise in the expansion tank 6 is reduced via the opening pressure of the pressure relief valve 19 located in the expansion tank cap 11.

In one exemplary embodiment, a valve 15 that can be subjected to active open-loop control is installed in the pneumatic supply line 14 in the direction of the expansion tank 6. The pressure accumulator 20 is filled by the system operating in parallel by means of the compressor 16 upon activation of the motor vehicle. Thus, the pressure level of the pressure accumulator 20 or a possibly reduced pressure level is present on the pressure side of the valve 15. In accordance with the activation of the compressor 16 in FIG. 1, the control unit 18 opens this valve 15 for a value which is constant over time or as a function of a characteristic curve stored in the control unit 18. The prevention of an excessively high system pressure is again ensured by the pressure relief valve 19 in the expansion tank 6.

In a more sophisticated exemplary embodiment, the expansion tank 6 contains a pressure sensor 17. The control unit 18 knows the pressure in the expansion tank 6 and the pressure in the pressure accumulator 20 by way of the pressure sensor 17 installed there. The valve 15 in the supply line to the expansion tank 6 is a valve 15 that can be subjected to active closed-loop control by the control unit 18. By means of the measured value of the pressure in the expansion tank 6 and the closed-loop control of the valve 15 in the supply line, the feed pressure can be set in a defined manner and can even be adapted to the driving situation and/or to the control strategy and/or the required hydraulic power.

In this case, the valve 15 can also be designed as a multiway valve which additionally permits a controlled pressure reduction.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An expansion tank arrangement of a cooling circuit, the expansion tank arrangement comprising:
   an expansion tank having a housing with an internal volume configured to receive a cooling fluid;
   a fluid connection configured to connect the expansion tank to the cooling circuit for supplying the cooling fluid; and
   a pneumatic connection configured to connect the expansion tank to a pneumatic supply device for pressurizing the expansion tank with a pneumatic medium using a pneumatic supply line,
   wherein a valve configured to influence the pressurization of the expansion tank is in the pneumatic supply line between the expansion tank and the pneumatic supply device, and
   wherein the valve is configured to prevent a pressure drop in the expansion tank.

2. The expansion tank arrangement as claimed in claim 1, wherein the housing has a tank and a tank cap, wherein the pneumatic connection is on the cap or on the tank.

3. The expansion tank arrangement as claimed in claim 1, wherein the valve is:
   a check valve;
   configured to be subjected to active open-loop control; or
   configured to be subjected to active closed-loop control.

4. The expansion tank arrangement as claimed in claim 1, wherein the pneumatic supply device is a compressor, which:
   is configured to deliver air or other gaseous medium, or
   has a pressure accumulator, and
   wherein the compressor is configured to deliver the air or the other gaseous medium to the pressure accumulator.

5. The expansion tank arrangement as claimed in claim 1, wherein the expansion tank, or a compressor, or a pressure accumulator, or the pneumatic supply line has at least one pressure sensor configured to measure a local pressure of the pneumatic medium.

6. A method for operating an expansion tank arrangement of a cooling circuit, wherein the expansion tank arrangement comprises: an expansion tank having a housing with an internal volume configured to receive a cooling fluid, a fluid connection configured to connect the expansion tank to the cooling circuit for supplying a cooling fluid, and a pneumatic connection configured to connect the expansion tank to a pneumatic supply device for pressurizing the expansion tank with a pneumatic medium using a pneumatic supply line, wherein a valve that is configured to influence the pressurization of the expansion tank is in the pneumatic supply line between the expansion tank and the pneumatic supply device, wherein the valve is configured to prevent a pressure drop in the expansion tank the method comprising:
   pressurizing the internal volume of the expansion tank using the pneumatic supply device and the pneumatic medium.

7. The method as claimed in claim 6, wherein:
   the valve is a check valve, and the method comprises the check valve preventing a pressure drop in the expansion tank, or
   the valve is configured to be subjected to active open-loop control, and the method comprises using the valve to set the pneumatic pressure in the expansion tank or to subject the pneumatic pressure in the expansion tank to open-loop control, or
   the valve is configured to be subjected to active closed-loop control, and the method comprises using the valve to set the pneumatic pressure in the expansion tank or to subject the pneumatic pressure in the expansion tank to closed-loop control.

8. The method as claimed in claim 6,
   wherein the pneumatic supply device is a compressor, which:
   delivers air or other gaseous medium toward the expansion tank, or
   has a pressure accumulator, and
   wherein the compressor delivers the air or the other gaseous medium to the pressure accumulator.

9. The method as claimed in claim 6, wherein the pneumatic pressure in the expansion tank is set, or subjected to open-loop control, or closed-loop control, using the valve, a compressor, or a pressure accumulator.

10. The method as claimed in claim 6,
    wherein the expansion tank, or a compressor, or a pressure accumulator, or the pneumatic supply line has at least one pressure sensor for local pressure measurement of the pneumatic medium,
    wherein the pneumatic pressure in the expansion tank is set, or subjected to open-loop control, or closed-loop control, using the valve, the compressor, or the pressure accumulator on the basis of measured pressure values of the pressure sensor or of the pressure sensors.

11. The expansion tank arrangement as claimed in claim 1,
    wherein the pneumatic supply device is a compressor, which:
    is configured to deliver air or other gaseous medium, or
    has a pressure accumulator, and
    wherein the compressor is a pneumatic supply device of a motor vehicle or a motor vehicle unit having a motor vehicle compressor with a downstream pressure accumulator, wherein the motor vehicle compressor is configured to deliver the air or the other gaseous medium to the downstream pressure accumulator.

12. The method as claimed in claim 6,
    wherein the pneumatic supply device is a compressor, which:
    delivers air or other gaseous medium toward the expansion tank, or
    has a pressure accumulator, and
    wherein the compressor is a pneumatic supply device of a motor vehicle or a motor vehicle unit having a motor vehicle compressor with a downstream pressure accumulator, wherein the motor vehicle compressor delivers the air or the other gaseous medium to the downstream pressure accumulator.

13. An expansion tank arrangement of a hybrid vehicle with an internal combustion engine and an electric motor for propulsion of the vehicle, the expansion tank arrangement comprising:
    an expansion tank having a housing with an internal volume configured to receive a cooling fluid for cooling electrical components of the hybrid vehicle;
    a fluid connection configured to connect the expansion tank to the cooling circuit for supplying the cooling fluid; and
    a pneumatic connection configured to connect the expansion tank to a pneumatic supply device for pressurizing the expansion tank with a pneumatic medium using a pneumatic supply line,
    wherein a valve configured to influence the pressurization of the expansion tank is in the pneumatic supply line between the expansion tank and the pneumatic supply device, the valve being configured to prevent a pressure drop in the expansion tank.

14. The expansion tank arrangement of claim 13, wherein the cooling fluid is configured to cooling a drivetrain battery system of the hybrid vehicle.

15. The expansion tank arrangement of claim 13, wherein the cooling fluid is configured for an operating temperature of 10° C. to 20° C.

16. The expansion tank arrangement of claim 13, wherein the pneumatic supply device is configured to pressurize at least one pneumatic system of the hybrid vehicle that is pneumatically independent of the expansion tank.

* * * * *